United States Patent [19]

Lebrocquy

[11] Patent Number: 5,595,265

[45] Date of Patent: Jan. 21, 1997

[54] PORTABLE VERTICAL LIFT

[76] Inventor: Chester J. Lebrocquy, 90 High St., Randolph, Mass. 02368

[21] Appl. No.: 300,790

[22] Filed: Sep. 2, 1994

[51] Int. Cl.$^6$ ...................................................... B66D 1/00
[52] U.S. Cl. ........................ 187/261; 187/244; 187/368; 254/387; 414/921
[58] Field of Search ............................ 254/387; 187/239, 187/243, 244, 261, 361, 368; 414/921

[56] References Cited

U.S. PATENT DOCUMENTS

| | | | |
|---|---|---|---|
| 2,531,346 | 11/1950 | Schuchert | 187/239 |
| 2,562,634 | 7/1951 | Nelson | 187/243 |
| 3,276,546 | 10/1966 | Slais | 187/261 |
| 3,517,774 | 6/1970 | Meyer | 187/368 |
| 4,347,913 | 9/1982 | Cromer, Jr. | |
| 4,633,538 | 1/1987 | James | 187/244 |
| 4,862,997 | 9/1989 | Eberle | 187/244 |
| 4,971,510 | 11/1990 | Houle | |
| 4,987,976 | 1/1991 | Daugherty | 187/243 |
| 5,090,667 | 2/1992 | Harrell | 254/387 |
| 5,102,179 | 4/1992 | Royer | 187/243 |
| 5,218,727 | 6/1993 | Krumbeck | 414/921 |
| 5,295,555 | 3/1994 | Strange | |
| 5,295,556 | 3/1994 | Mullin | |
| 5,307,899 | 5/1994 | Lubinski | |
| 5,314,042 | 5/1994 | Adams | |
| 5,320,194 | 6/1994 | Bredijk | |
| 5,322,408 | 6/1994 | Wooden | 414/921 |

FOREIGN PATENT DOCUMENTS

| | | | |
|---|---|---|---|
| 292329 | 2/1967 | Australia | 187/243 |

*Primary Examiner*—Katherine Matecki
*Attorney, Agent, or Firm*—Choate, Hall & Stewart

[57] ABSTRACT

A portable apparatus for raising and lowering a load vertically along a substantially vertical structure. The apparatus comprises a vertical guide, which is secured to the substantially vertical structure by a retainer. A carriage is movably attached to the vertical guide and a platform which supports the load is attached to the carriage. The carriage is raised and lowered along the vertical guide by some means whereby the load is raised and lowered along the vertical guide. The carriage also comprises a safety brake for immobilizing the carriage with respect to the vertical guide when the means for raising and lowering the carriage is inoperative or malfunctions. The apparatus further comprises wheels rotatingly attached to the bottom of the vertical guide and a hitch attached to the top of the vertical guide, such that the entire device may be towed behind a vehicle.

8 Claims, 8 Drawing Sheets

PORTABLE VERTICAL LIFT

BACKGROUND OF THE INVENTION

1. Field of the Invention

This invention pertains to a portable vertical lift, as may be used to lift wheelchair-bound hunters into trees. As our society progresses, the number of activities which are accessible to the physically disadvantaged or in which the physically disadvantaged desire to participate is also increasing. Sports for the wheelchair-bound, such as racing and basketball, are no exception to this trend, and hunting is included among these sports. However, as in many of these cases, the physically disadvantaged present unique needs and special devices are required to allow their full participation. For example, consider the case of a physically disadvantaged hunter who is confined to a wheelchair. It is common for hunters to construct a tree stand in a tree and then wait in the tree stand for game to come by. Such a feat is extremely impractical for a hunter confined to a wheelchair. A need exists to overcome this impracticality.

2. Description of the Related Art

Portable lifts are well-known in the art. However, all of the related art is deficient in some way which precludes their advantageous use in the above application. For example, small manually operated lifts, such as car jacks, do not have the required vertical travel and would be difficult to stabilize in the intended environment. Manually operated high-lift jacks, which are essentially larger versions of the auto jack, may have the required travel, but their larger size makes them difficult to transport, the manual operation results in a lifting which is unacceptably slow and tedious, and they can also be difficult to stabilize. Conventional lifts such as those used by roofers to shuttle material from ground level to a rooftop are also inadequate. These lifts are usually based on a long ladder, which is supported by leaning the ladder against a structure such as a roof edge. A platform is then run along the ladder. However, the ladder is longer than necessary since it must be leaned against the supporting structure, which can be problematic in the hunting application. Furthermore, such devices are not designed to be used in a near vertical orientation and they can be difficult to transport through wooded terrain. In addition, all of these lifts are designed to lift loads less critical than human beings and so many of them also lack adequate safety devices which would protect a passenger in the event that the lifting mechanism becomes inoperative.

At the other extreme of the related art are much heavier lifts. Examples of these would include forklifts and self-propelled platform lifts such as those used in warehouses and at construction sites. While these lifts have the required load-bearing capacity and vertical travel, they are grossly inadequate in other respects. Many of these lifts are designed only for use on smooth surfaces, such as a warehouse floor, a highway bed or a dockside pier, and would be totally unsuitable for use on rough terrain. This restriction applies both to the transportation of the lift and the manner in which the lift is stabilized. Furthermore, the lifts in these devices are already larger, heavier and more costly than is required for the current application, and the power source required for self-propulsion simply makes the device even larger and heavier. The result is a device which is too large and heavy for use in the hunting environment.

There are also a large number of lifts designed for increasing the mobility of the physically impaired, including the wheelchair-bound. However, these lifts also fall short of the required characteristics. First, many of them are not portable, the overwhelming majority being intended for use as a permanent entrance to a building or vehicle. Second, they have insufficient vertical travels. For example, lifts used with buses need only travel from the curb to the bus floor, a maximum of several feet. Third, many of the operating mechanisms are not suitable for use in a hunting environment. In any case, no lift for the physically disadvantaged combines the portability, flexibility, and lift range required.

SUMMARY OF THE INVENTION

The invention is a portable apparatus for raising and lowering a load vertically along a substantially vertical structure. The apparatus comprises a vertical guide, which is secured to the substantially vertical structure by a retainer. A carriage is movably attached to the vertical guide and a platform which supports the load is attached to the carriage. The carriage is raised and lowered along the vertical guide by some means whereby the load is raised and lowered along the vertical guide.

In a preferred embodiment of the invention, the means for raising and lowering the carriage comprises a winch attached to the vertical guide, a pulley attached to the top of the vertical guide, and a cable attached to the carriage, run through the pulley and wound onto the winch. The carriage may be raised and lowered by winding or unwinding the cable onto the winch. The carriage also comprises a safety brake for immobilizing the carriage with respect to the vertical guide when the means for raising and lowering the carriage is inoperative. The embodiment further comprises wheels rotatingly attached to the bottom of the vertical guide and a hitch attached to the top of the vertical guide, such that the entire device may be towed behind a vehicle.

The invention also includes a method for raising and lowering a load vertically along a substantially vertical structure. The method comprises providing and securing a temporary guide to the substantially vertical structure. A moveable carriage is provided and movably disposed on the guide. A load supporting platform is attached to the carriage and the load is disposed on the platform. The load is then raised and lowered along the substantially vertical structure by raising and lowering the carriage along the guide.

DESCRIPTION OF THE PREFERRED EMBODIMENT

Figure 1:
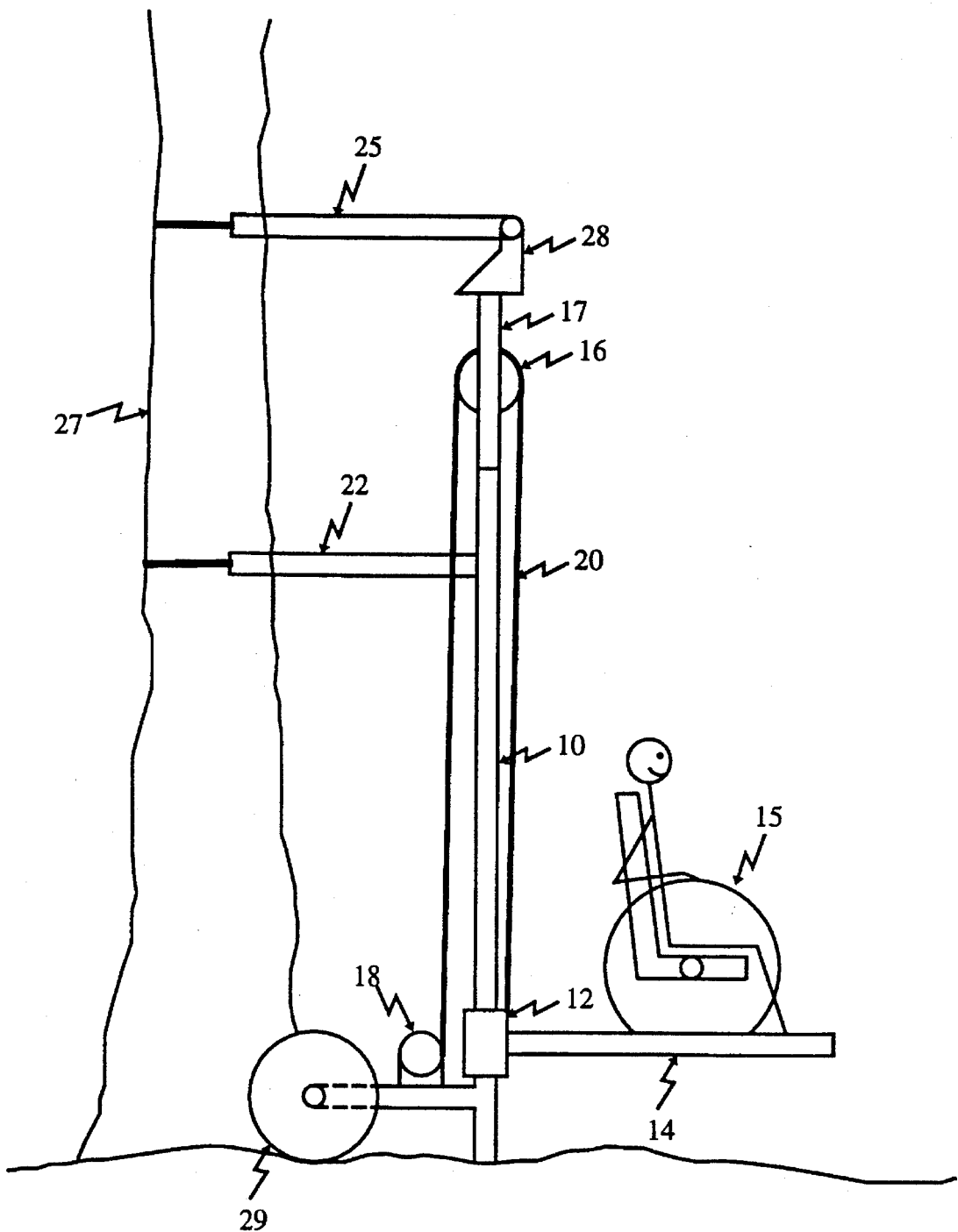
FIG. 1 is a schematic side view of a preferred embodiment of the invention.

The invention will be described with the aid of FIG. 1, which shows a preferred embodiment of the invention adapted for lifting a person in a wheelchair alongside a tree. This scenario is selected for the purpose of illustrating one mode of practicing the invention and it is to be understood that the invention is not limited to lifting persons in wheelchairs, nor is it limited to lifting loads alongside trees. In this embodiment, a vertical post 10 provides the main structural support. In other embodiments, other structures such as tracks, guides, beams or cables may be used instead. A carriage 12 is disposed about the post 10 and may be freely translated up and down along the post 10. A platform 14 is used to support the load 15 being lifted and is attached to the carriage 12. A pulley 16 is attached to the upper portion of the vertical post 10 by means of a shorter post 17 which is detachable from the main post 10. A winch 18 is also connected to the post 10. A cable 20 runs from the winch 18, through the pulley 16 and attaches to the carriage 12. The winch 18, pulley 16 and cable 20 are used to raise and lower the carriage 12 and platform 14. The invention is stabilized in part by a lower binder 22 and upper binder 25 which secure the invention to a tree 27 or other suitable structure. The lower binder 22 is attached directly to the vertical post 10, while the upper binder 25 is attached to a ball hitch 28 which is attached to the shorter post section 17. Both binders 22, 25 may or may not be detachable from the post 10 and ball hitch 28, respectively. If greater height is required, the main post 10 may be lengthened by adding extension sections between the main post 10 and the shorter post 17. In order to accommodate the greater lift range, the cable 20 may be unwound from the winch 18 or a longer cable may be provided. Adding extension sections to the main post 10 does not compromise the stability of the invention since the position of the lower binder 22 is fixed relative to the lower end of the main post 10 while the position of the upper binder 25 adjusts to the height of the main post 10 and any extension thereof.

It is desirable to make the invention as transportable as possible. Accordingly, in a preferred embodiment, a set of wheels 29 is attached to the bottom portion of the post 10. The wheels 29 and ball hitch 28 allow the entire device to be pulled behind a vehicle after the binders 22, 25 are detached. In other environments, runners, skids, pontoons, or other suitable devices may be used instead of wheels 29 to provide for efficient conveyance of the invention. The winch 18 may be an electric winch powered by a twelve volt battery. A gas-powered generator or similar power source may be used, but this typically results in an increase in size and weight. A manual winch may also be used, potentially resulting in an even more transportable device. However, such a winch may make the task of lifting the load more difficult.

Figure 2A:
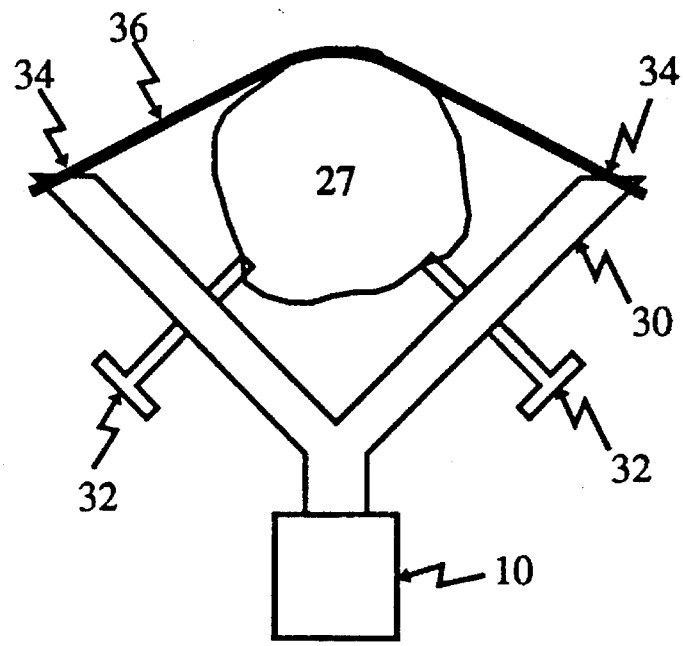
FIG. 2A is a top view of the lower binder depicted in FIG. 1.
Figure 2B:
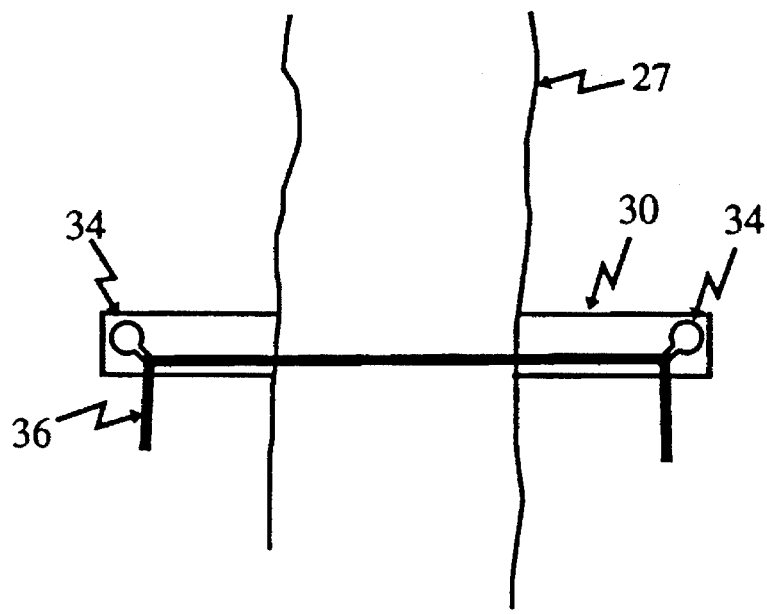
FIG. 2B is a front view of the lower binder of FIG. 2A.
Figure 3:
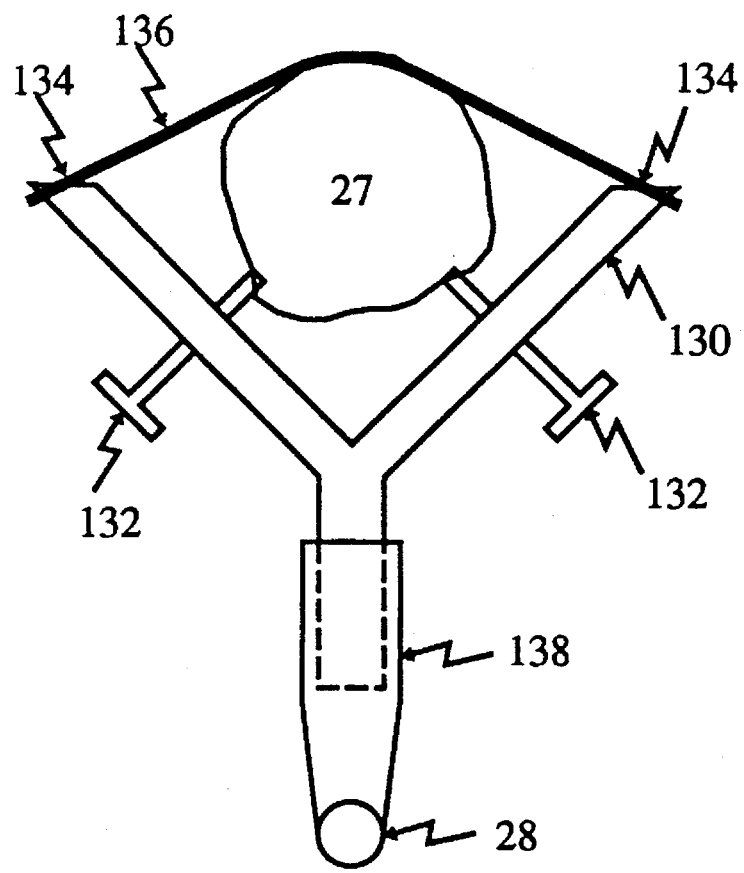
FIG. 3 is a top view of the upper binder depicted in FIG. 1.

Further details of this embodiment are shown in FIGS. 2–5. FIG. 2A shows a top view of the lower binder 22. In this embodiment, the lower binder 22 is rigidly attached to the main post 10. The attachment may be permanent, as with welding or rivets, or it may be non-permanent, as with bolts or pins. The binder itself consists of a frame 30 with two branches, each branch having locations for adjustable T-bolts 32 and keyhole slots 34. A chain 36 passes through the keyhole slots 34 and around the tree 27. The keyhole slots 34 are specially shaped apertures, more clearly shown in the front view of FIG. 2B, which allow the length of the chain 36 to be adjusted. By adjusting the T-bolts 32 and the length of the chain 36, the lower binder 22 may be fastened securely about many differently sized trees and without damaging the trees. The upper binder 25, shown in FIG. 3, is similar to the lower binder 22 in that it also contains a frame 130, T-bolts 132, keyhole slots 134 and a chain 136. However, upper binder 25 incorporates the following additional features which make it more adjustable. First, the frame 130 is attached to the ball hitch 28 through an adjustable sleeve 138 which allows the distance from the ball hitch 28 to the frame 130 to be adjusted. Second, the adjustable sleeve 138 attaches in a swivel fashion to the ball hitch 28. The adjustable length and swivel attachment result in additional freedom of motion in adjusting the upper binder 25. Thus, for example, the binder may be attached to upper areas of a tree which may be positioned at odd angles or of unusual shapes. While FIGS. 2A–3 illustrate a preferred embodiment of the two binders which stabilize the invention, other modifications of the invention will be apparent to those skilled in the art from the teaching herein. For example, the invention need not be stabilized with two binders. Three or more binders or even just a single binder could be used. Furthermore, the binders need not be the exact design disclosed herein and the design disclosed herein need not comprise the exact components disclosed. Consider the lower binder 22 as an example. The number of branches in the frame 30 need not be exactly two nor must the branches be symmetrically disposed. The T-bolts 32 need not be exactly one per branch. Other types of standoffs, such as inflatable devices or adjustable-length suction-tipped rods, could be used in place of the T-bolts 32. Furthermore, the chain 36 could be replaced by a length of rope, a leather belt, a metal band, or the like, with the keyhole slots 34 being modified accordingly.

Figure 4A:
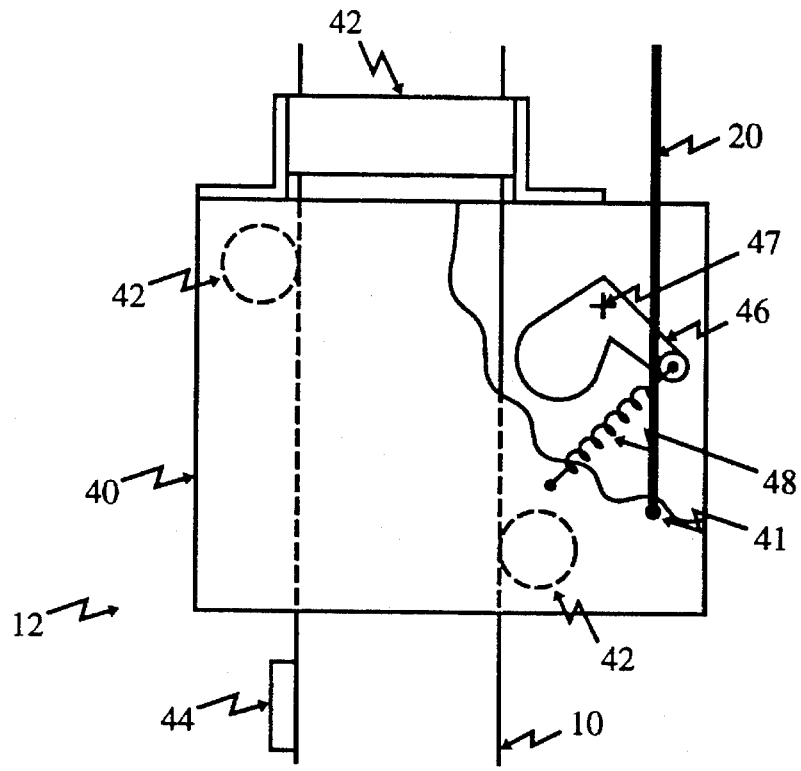
FIG. 4A is a side view of the carriage depicted in FIG. 1, with the cam lock off.
Figure 4B:
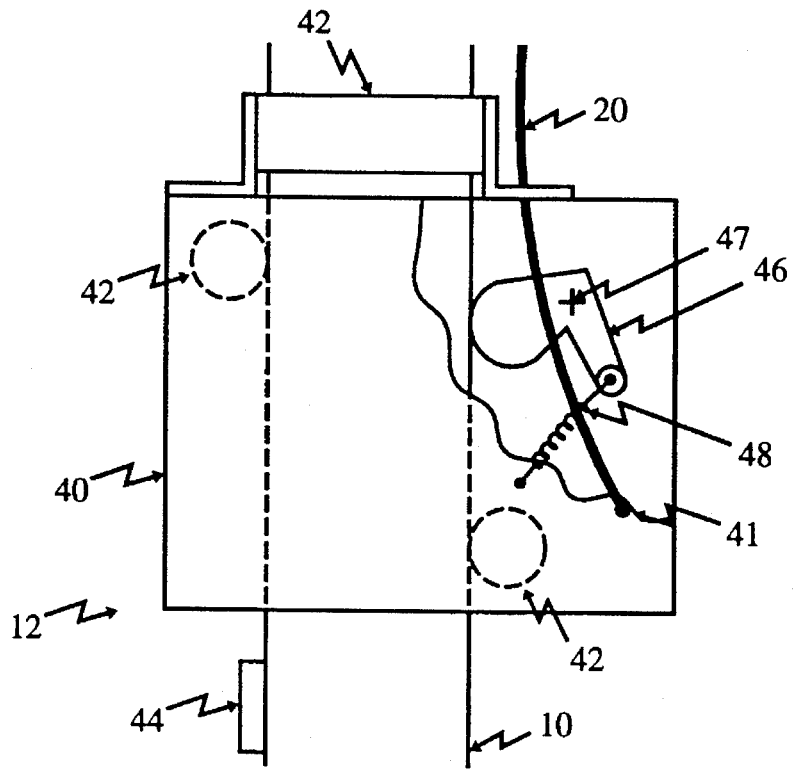
FIG. 4B is a side view of the carriage depicted in FIG. 4A illustrating the operation of the cam lock.

FIG. 4A shows the carriage 12 in more detail. The carriage 12 consists of a frame 40 which is guided along the main post 10 by a set of rollers 42. The cable 20 is also attached to the frame 40 at any suitable point 41. For safety, physical stops 44 may be attached to the main post 10 to prevent the carriage from traveling outside its intended range. Additionally, a cam 46 which pivots about a pivot point 47 prevents the carriage 12 from falling in the event of a loss of tension in the cable 20. The upper right portion of the frame 40 is cut away in the depictions in FIGS. 4A and 4B to more clearly show this feature. As shown in FIG. 4B, if the cable 20 loses tension, the spring 48 will rotate the cam 46 in a clockwise direction as depicted into a position where the cam 46, and hence the carriage 12, will be locked against the post 10, preventing downward motion. In normal operation, as shown in FIG. 4A, the taut cable 20 releases the cam 46 from its braking point and the carriage 12 is free to move along the post 10.

Figure 5:
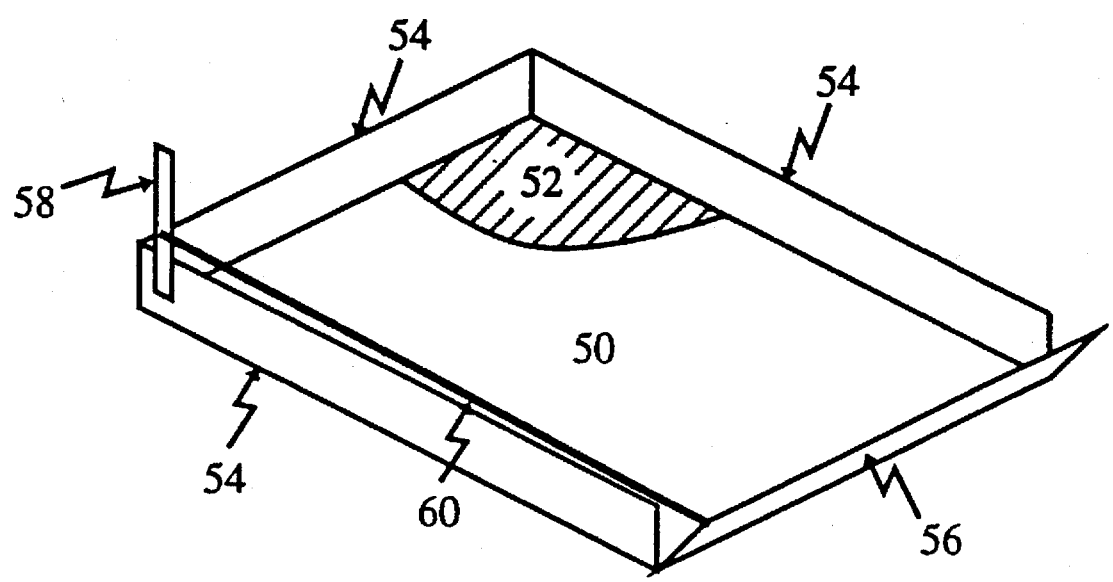
FIG. 5 is a perspective view of a platform in an exemplary embodiment of the invention.

A platform 14 adapted for wheelchair use is illustrated in FIG. 5. The platform 14 comprises metal decking 50 disposed on top of a metal frame 52. There are three side safety rails 54 and a gate 56 which is operated by a locking handle 58 and cable 60. When the gate 56 is down, loading ramps may be attached to the gate area to allow a wheelchair to more easily enter the platform. Alternatively, the gate 56 may itself be used as a ramp.

In one possible scenario, the previous embodiment may be used as follows. A hunting party could transport the invention to the hunting site by towing it behind an all-terrain vehicle. Once the hunting site was reached, the invention could be attached to a tree and the physically disadvantaged hunter then lifted into the tree. The lift is the physically disadvantaged hunter's equivalent of the tree stand used by other hunters. As such, the lift is intended to be used at a wooded hunting site which may be a significant distance from paved roads. Therefore, it is portable over rough terrain, as the hunting party will often travel significant distances into wooded areas before choosing a hunting site. It is also easily assembled and disassembled since the hunting site is temporary and may change several times over the course of a hunting expedition. The lift is adapted for use on uneven surfaces, such as a forest floor, and the lift is stabilized by a method also suitable for this type of environment. Finally, the lift is configured to safely lift a load the size of a wheelchair-bound hunter tens of feet above the ground in a near-vertical fashion. The nature of the application requires adequate safety devices, the cam-lock and safety stops, to insure the well-being of the hunter.

Although the invention is primarily discussed in terms of lifting physically disadvantaged people in wheelchairs, it is to be understood that the invention is not limited to this application and that other types of platforms may be used to lift other types of loads. For example, the platform may be a custom made chair for a physically-impaired person or a regular seat for use by an unimpaired person. As another example, the platform may be designed to lift workers who are standing, as may be required in tree trimming operations or construction work. As a further example, the invention may be used to lift loads such as construction materials, advertising materials, etc., and the platform may be designed accordingly to accommodate any load desired.

Figure 6:
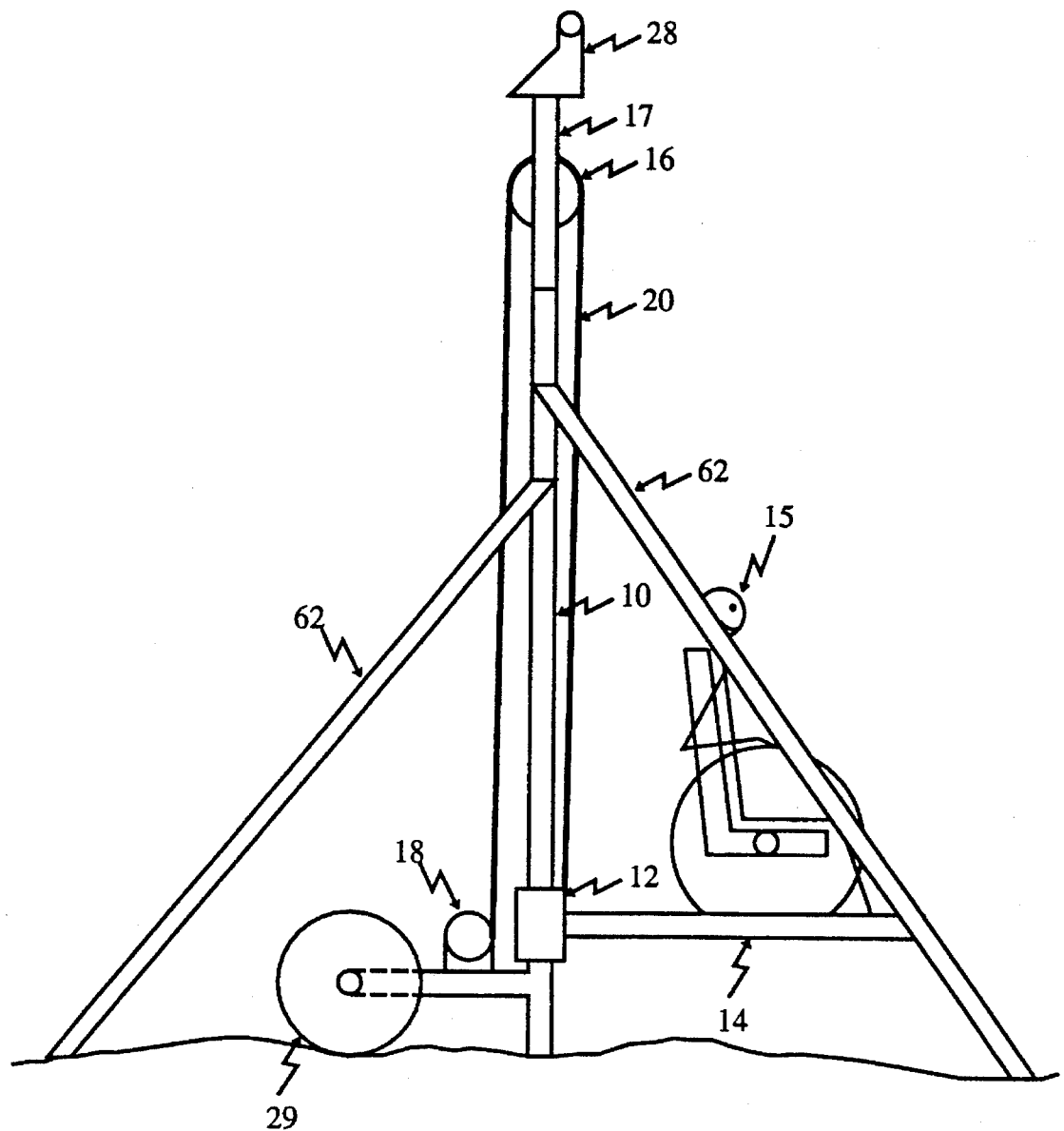
FIG. 6 is a side view of an alternate embodiment of the invention supported by outriggers.
Figure 7:
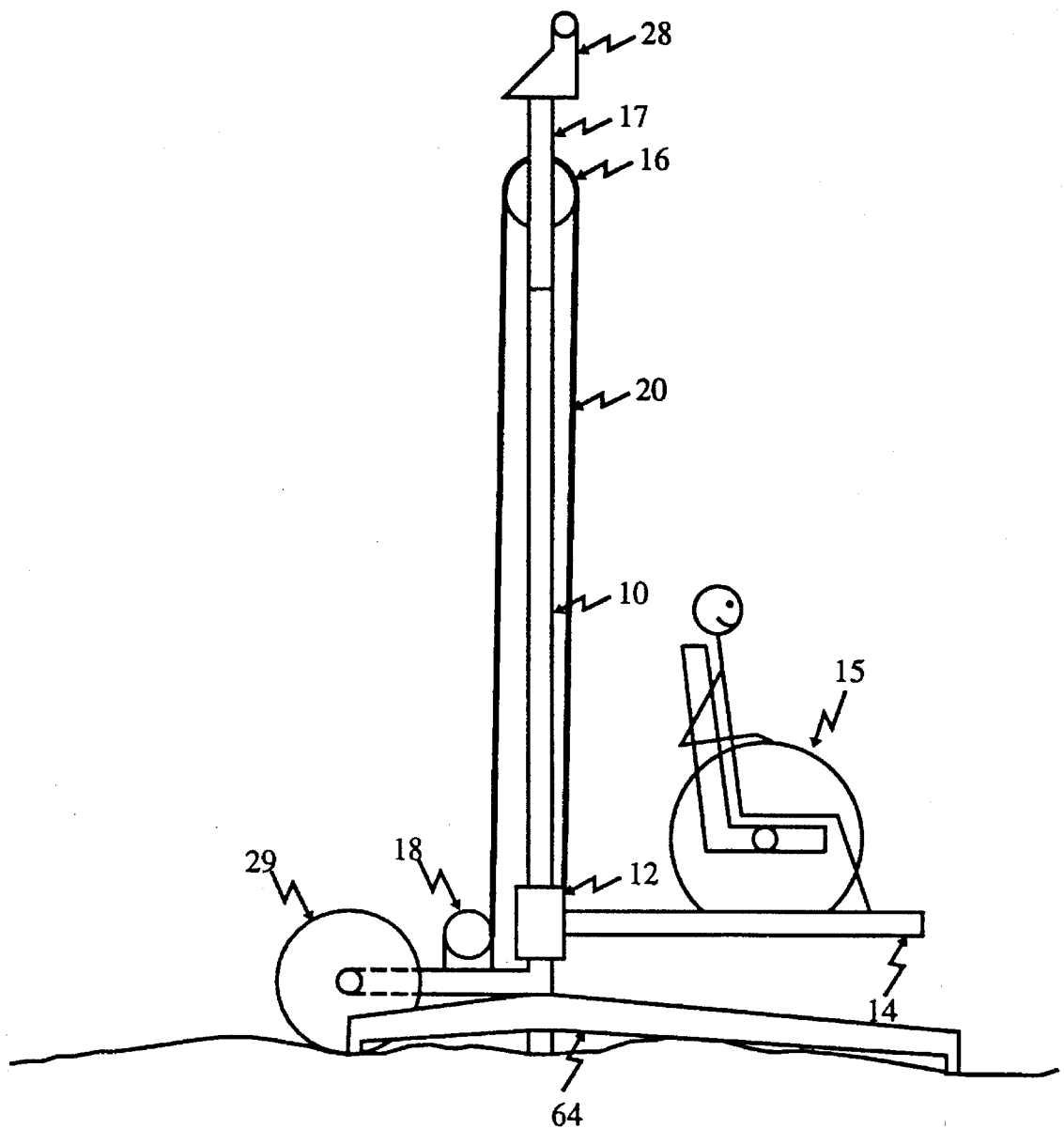
FIG. 7 is a side view of yet another alternate embodiment of the invention stabilized by a heavy base.
Figure 8:
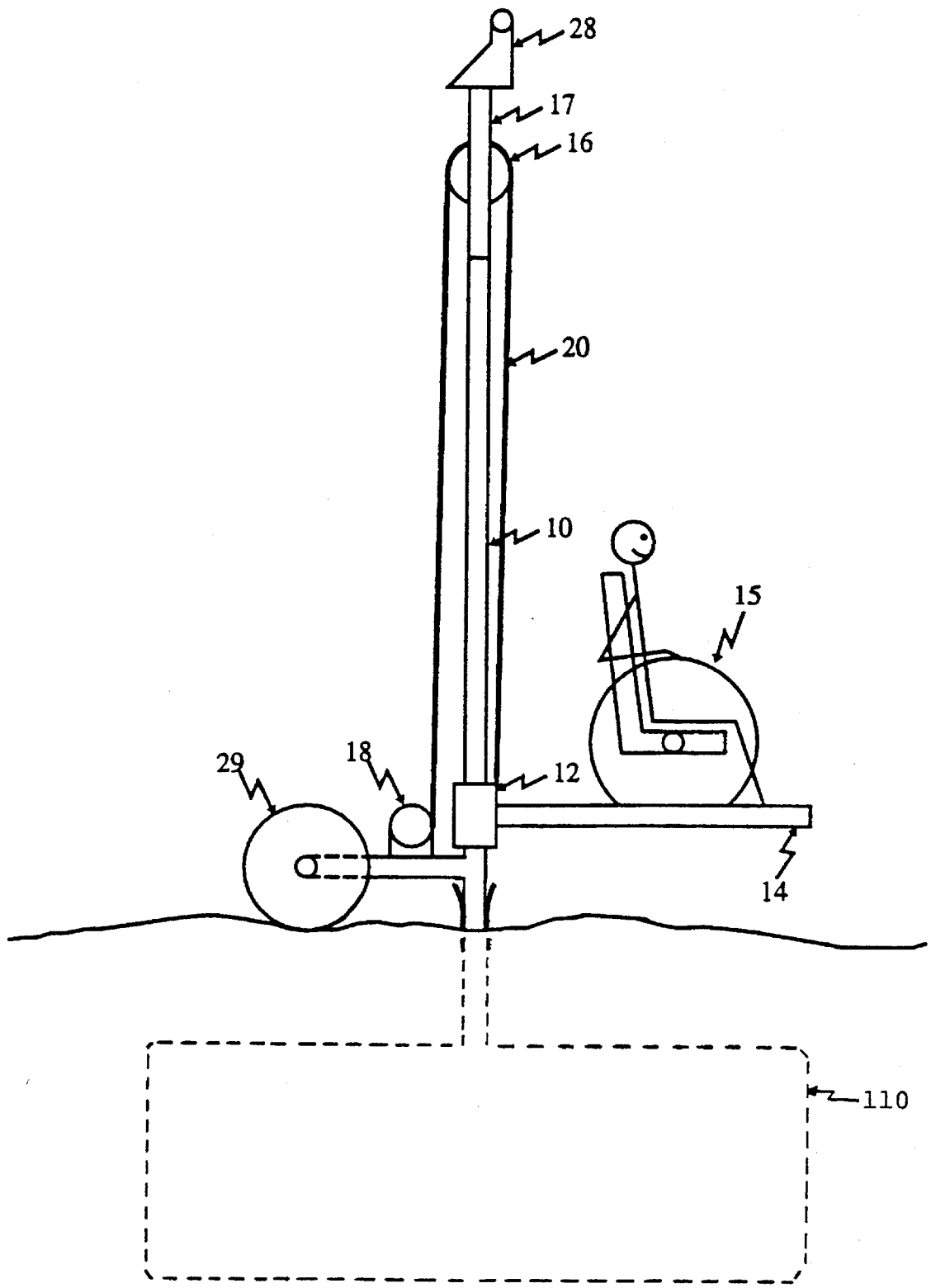
FIG. 8 is a side view of yet a further another alternate embodiment of the invention stabilized by a permanent receptacle.

In addition, although the invention has been discussed in the context of being supported in part by another vertical structure such as a tree, pole, or chimney, the invention may also be used in a free-standing context as shown in FIGS. 6, 7 and 8. FIG. 6 shows the device as supported by outriggers 62. One end of each outrigger is connected to an upper portion of the invention, the main post 10 in the embodiment of FIG. 6, while the other end is securely attached to a supportive structure, the ground in FIG. 6. The outriggers may take many forms: cables secured to adjacent structures or rods secured to one another by a base, for example. FIG. 7 shows the device being stabilized by an appropriate base 64 which may be weighted or which may include the provision for being weighted by removable weights transported to the use site or by rocks, soil or other material available at the use site. In a preferred embodiment, the base 64 is sized and configured so as not to require any additional weighting and could include, for example, one or more adjustable leveling devices as are conventionally known. Such device include outrigger members with threadedly adjustable foot pads.

In an alternate embodiment depicted in FIG. 8, the post 10 may be received in an appropriately configured receptacle 110 permanently installed in the ground or other stable element. In this manner, the apparatus may be transported to a site, such as a plain or open range lacking trees or other substantially vertical members, and utilized in the advantageous manner heretofore described.

It is therefore desired to be secured in the appended claims all such modifications as fall within the true spirit and scope of the invention. Accordingly, what is desired to be secured by Letters Patent of the United States is the invention as defined and differentiated in the following claims.

What is claimed is:

1. A portable apparatus for raising and lowering a load vertically along a substantially vertical structure comprising:

a post including
  a) a first post member; and
  b) a second post member, a bottom portion of which is detachably attached to a top portion of the first post member, whereby additional post sections may be disposed between the first and second post members to increase an overall height of the post;

a carriage movably attached to the post;

a winch attached to the post;

a pulley attached to a top portion of the post;

a cable, a first end of which is wound onto the winch, and a second end of which passes through the pulley and is connected to the carriage, whereby the carriage may be raised and lowered by winding and unwinding the cable onto the winch;

a platform attached to the carriage for supporting the load;

a wheel rotatingly attached to a bottom portion of the post;

a hitch attached to the top portion of the post, whereby the apparatus may be transported; and a retainer for securing the post to the substantially vertical structure wherein the retainer comprises:

a lower binder comprising:
  a) a frame having two branches adapted for fastening a variable length of chain therebetween and a base attached to the first post member; and
  b) a spacer having an adjustable position located in each of the two branches of the frame, one end of each spacer adapted for contacting the substantially vertical structure; and an upper binder comprising:
  a) a frame having two branches adapted for fastening a variable length of chain therebetween and an adjustable length base swivelly attached to the hitch; and
  b) a spacer having an adjustable position located in each of the two branches of the frame, one end of each spacer adapted for contacting the substantially vertical structure.

2. The apparatus of claim 1 wherein the post comprises a physical stop, whereby the movement of the carriage along the post is limited.

3. The apparatus of claim 1 wherein the retainer is detachable from the post.

4. The apparatus of claim 1 wherein the platform comprises:

a substantially horizontal floor for supporting a wheelchair;

a gate hingably attached to a first section of a periphery of the floor;

a safety rail attached to a second section of the periphery of the floor; and means for operating the gate.

5. The apparatus of claim 1 wherein the carriage further comprises a safety brake for automatically immobilizing the carriage with respect to the post when the winch is inoperative.

6. The apparatus of claim 1 further comprising a biased cam pivotally attached to the carriage such that in a biased position the cam is wedged against the post preventing downward movement of the carriage, and in a retracted position the cam is retracted from the post permitting downward movement of the carriage.

7. The apparatus of claim 6 wherein position of the cam is controlled by tension in the cable biasing the cam in a first direction and a spring biasing the cam in an opposing direction.

8. The apparatus of claim 1 wherein the platform comprises:

a substantially horizontal floor for supporting a wheelchair;

a gate hingably attached to a first section of a periphery of the floor;

a safety rail attached to a second section of the periphery of the floor; and means for operating the gate.

* * * * *